United States Patent
Nakanishi et al.

(10) Patent No.: US 6,826,060 B2
(45) Date of Patent: Nov. 30, 2004

(54) POWER SUPPLY APPARATUS

(75) Inventors: Tsutomu Nakanishi, Mie (JP); Tsuneo Tsuji, Mie (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/258,370

(22) PCT Filed: Mar. 5, 2002

(86) PCT No.: PCT/JP02/02043

§ 371 (c)(1),
(2), (4) Date: Apr. 3, 2003

(87) PCT Pub. No.: WO02/071590

PCT Pub. Date: Sep. 12, 2002

(65) Prior Publication Data

US 2003/0156434 A1 Aug. 21, 2003

(30) Foreign Application Priority Data

Mar. 7, 2001 (JP) ............................ 2001-063060

(51) Int. Cl.⁷ ............................................. H02M 3/335
(52) U.S. Cl. ......................................... 363/20; 363/97
(58) Field of Search ........................... 363/20, 21.1, 80, 363/95, 97, 131

(56) References Cited

U.S. PATENT DOCUMENTS

| | | | | |
|---|---|---|---|---|
| 5,488,552 A | * | 1/1996 | Sakamoto et al. | 363/97 |
| 5,754,414 A | * | 5/1998 | Hanington | 363/21.12 |
| 5,917,711 A | * | 6/1999 | Shikata et al. | 363/16 |
| 6,542,387 B2 | * | 4/2003 | Tsuge | 363/21.01 |
| 6,700,801 B2 | * | 3/2004 | Morita et al. | 363/21.12 |

FOREIGN PATENT DOCUMENTS

| | | |
|---|---|---|
| JP | 2000-197275 | 7/2000 |
| JP | 2000-341941 | 12/2000 |
| JP | 2001-25249 | 1/2002 |

\* cited by examiner

*Primary Examiner*—Adolf Berhane
(74) *Attorney, Agent, or Firm*—RatnerPrestia

(57) ABSTRACT

In a power supply apparatus having voltage doubler rectifier circuit (5) connected to secondary winding (1B) of transformer (1), diode (13) is connected between transistor (3) and primary winding (1A) of transformer (1). By detecting an AC voltage at a junction point between primary winding (1A) of transformer (1) and diode (13) thereby performing over-voltage protection, the difference between the maximum operating voltage and the no-load operating voltage is decreased and the voltage during no-load operation is lowered and thus small-sized power supply apparatus and peripheral equipment can be provided.

5 Claims, 5 Drawing Sheets

POWER SUPPLY APPARATUS

This application is a U.S. National Phase Application of PCT International Application PCT/JP02/02043.

TECHNICAL FIELD

The present invention relates to a power supply apparatus for use in electrostatic recording apparatuses such as copiers and printers.

BACKGROUND ART

An example of a power supply apparatus of a conventional art is shown in FIG. 5.

In FIG. 5, transformer 1 has primary winding 1A and secondary winding 1B. One end of primary winding 1A is connected with first DC power source 2 and the other end of primary winding 1A is connected with transistor 3 as a switching element. Diode 4 is connected in parallel with the collector and the emitter of transistor 3. The anode of diode 4 is grounded.

Voltage doubler rectifier circuit 5 is formed of rectifier diodes 5A, 5B, smoothing capacitors 5C, 5D, and discharging resistor 5E. The input terminal of voltage doubler rectifier circuit 5 is connected with secondary winding 1B of transformer 1. One of the outputs of voltage doubler rectifier circuit 5 is connected with output terminal 6 of the power supply apparatus and the other of the outputs of voltage doubler rectifier circuit 5 is grounded through current detector 7.

Current detector 7 is connected with one of the comparison inputs of error amplifier 9 and the other of the comparison inputs of error amplifier 9 is connected with second DC power source 10. The output of error amplifier 9 is fed into control circuit 8 and the output of control circuit 8 is connected to the base of transistor 3. Control circuit 8, in receipt of the output signal of error amplifier 9, can vary a signal fed to the base of transistor 3.

Then, voltage detector 11 is connected to the junction point between primary winding 1A and transistor 3. The output of voltage detector 11 is connected to control circuit 8 through limiter 12. Limiter 12, when an input thereto exceeds a predetermined operating level, outputs a signal for limiting the output of control circuit 8.

Operation will be described below. A DC voltage supplied from first DC power source 2 to primary winding 1A of transformer 1 is subjected to switching in transistor 3 and thereby an AC voltage is induced in secondary winding 1B. The generated AC voltage is doubled and rectified in voltage doubler rectifier circuit 5, whereby a DC voltage whose voltage value is the same as the amplitude voltage of the AC voltage generated in secondary winding 1B is generated at output terminal 6 of the power supply apparatus.

When a load is connected to the power supply apparatus and a current is allowed to pass therethrough, a current of the same value as the load current is fed through current detector 7 to have a voltage generated therein. The generated voltage is fed into the comparison input of error amplifier 9 and compared with the voltage of third DC power source 10.

Based on a result of the comparison, a signal to the base of transistor 3 is varied through control circuit 8 and control is performed such that the voltage of third DC power source 10 and the voltage generated in current detector 7 become the same in value.

Thus, the load current of the power supply apparatus is kept constant.

Then, when the impedance of the load becomes higher, the voltage at output terminal 6 becomes higher and the voltage in primary winding 1A of the transformer is elevated. If, at this time, the voltage of voltage detector 11 exceeds a limited operating level of limiter 12, limiter 12 supplies a signal to control circuit 8 to limit the output, whereby abnormal rise of the output voltage of the power supply apparatus is limited and a dielectric breakdown is prevented.

In the above described configuration, the voltage waveform in secondary winding 1B comes to have ringing portions at both the forward period and the flyback period as shown in FIG. 4C. However, the voltage waveform in primary winding 1A, though it is analogous to the waveform in secondary winding 1B at the flyback period, is brought to grounded potential at the forward period, as shown in FIG. 4A, because the ringing portion is clipped by diode 4 at the forward period.

The effect of the difference between the voltage waveform in secondary winding 1B and the voltage waveform in primary winding 1A on the load limiting characteristic will be described below.

When the load current is decreased with increase in the load impedance, since the voltage waveform in secondary winding 1B is such that has ringing portions both at the forward period and at the flyback period, similarly to the waveform shown in FIG. 4C, the output voltage of voltage doubler rectifier circuit 5 becomes the sum of the voltage peak value at the forward period and the voltage peak value at the flyback period.

However, the voltage waveform in primary winding 1A has the voltage peak value only at the flyback period as shown in FIG. 4A because the ringing portion at the forward period is clipped by diode 4. Therefore, the voltage becomes lower than the output voltage which is inherently expected. Accordingly, the voltage on which limiter 12 operates becomes different from the output voltage on which it is inherently expected to operate.

Consequently, inclination is produced in the load limiting characteristic as indicated by A in FIG. 3 and hence the output voltage is increased at the time when the load current decreases and of no load. As a result, it is required to provide excessive insulation and this has been a problem in producing power supply apparatuses and peripheral equipment thereof smaller in size.

DISCLOSURE OF INVENTION

There is provided a power supply apparatus which comprises: a transformer having a primary winding and a secondary winding; a first DC power source connected to one terminal of the primary winding of the transformer; a diode whose anode is connected to the other terminal of the primary winding of the transformer; a switching element connected between the cathode of the diode and the ground; a voltage doubler rectifier circuit connected to the secondary winding of the transformer; a current detector for detecting a DC current from the voltage doubler rectifier circuit; a control circuit for controlling the switching element in accordance with an output from the current detector; an AC voltage detector connected in parallel between a junction point between the anode of the diode and the other terminal of the primary winding of the transformer and the ground; and a limiter for controlling the switching element when the output of the AC voltage detector exceeds a predetermined voltage value thereby limiting voltage of the secondary winding of the transformer.

BEST MODE FOR CARRYING OUT THE INVENTION

Figure 1:
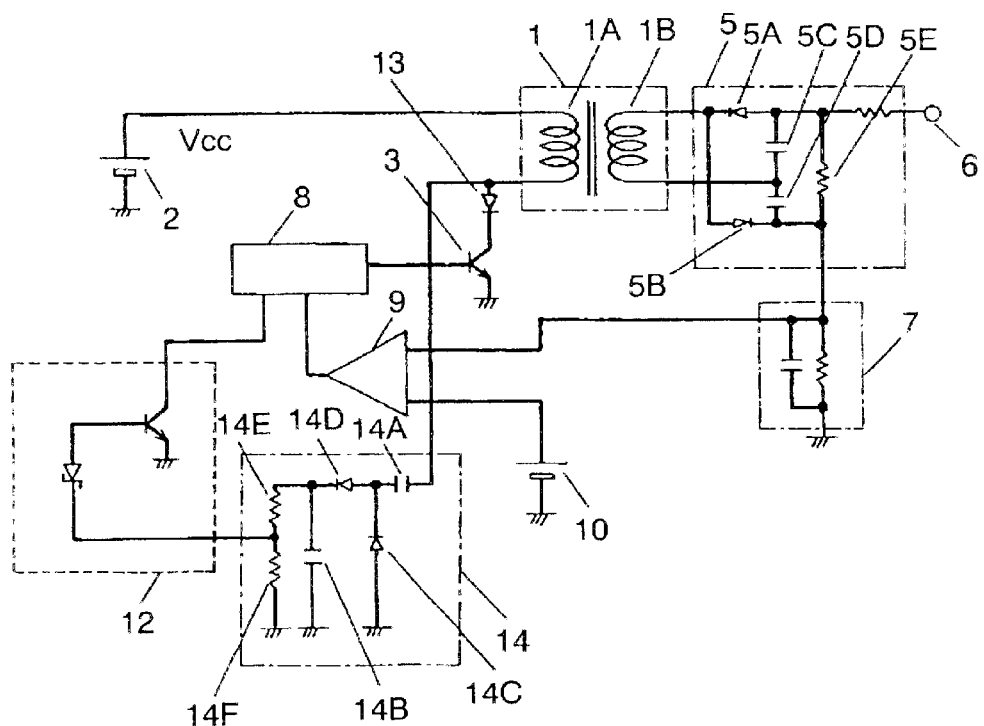
FIG. 1 is a circuit diagram of a power supply apparatus according to a first preferred embodiment of the invention.

A preferred embodiment of the present invention will be described with reference to FIG. 1 to FIG. 4. Throughout the description, corresponding parts to those in the conventional art are designated by like reference characters and descriptions about these parts will be simplified.

(First Preferred Embodiment)

A first preferred embodiment of the invention will be described below with reference to the accompanying drawings.

In FIG. 1, transformer 1 has primary winding 1A and secondary winding 1B. One terminal of primary winding 1A is connected with first DC power source 2 whose voltage is Vcc and the other terminal of primary winding 1A is connected with the anode of diode 13. Further, the collector of transistor 3 as a switching element is connected with the cathode of diode 13, while the emitter of transistor 3 is connected with the earth (ground).

AC voltage detector 14 constitutes a voltage doubler rectifier circuit by using capacitors 14A, 14B, diodes 14C, 14D and resistors 14E, 14F. The input of AC voltage detector 14 is connected with the junction point between the anode of diode 13 and the other terminal of primary winding 1A of transistor 3, while the output of AC voltage detector 14 is connected with limiter 12.

Operation will be described below. Since diode 13 is connected in series with transistor 3 in such a configuration as to protect transistor 3 from a reverse voltage, the voltage waveform in primary winding 1A also has the negative portion, i.e., the ringing portion, on the forward side as shown in FIG. 4B, analogously to the voltage waveform in secondary winding 1B.

The effect, on the load limiting characteristic, of the voltage waveform in primary winding 1A becoming analogous to the voltage waveform in secondary winding 1B will be described.

Figure 4A:
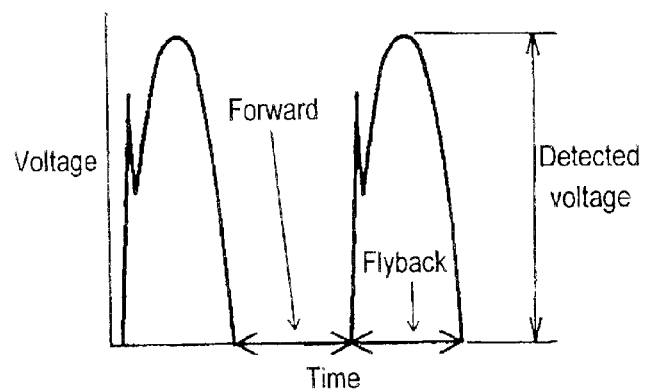
FIG. 4A is a voltage waveform diagram of the primary winding of the transformer in a power supply apparatus of a conventional art.
Figure 4B:
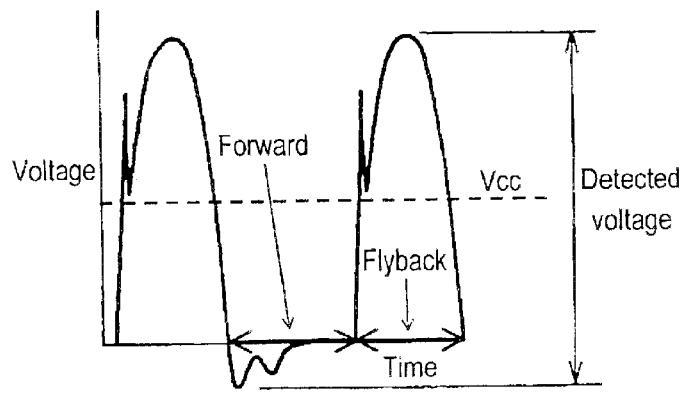
FIG. 4B is a voltage waveform diagram of the primary winding of the transformer in the power supply apparatus of the first preferred embodiment of the invention.
Figure 4C:
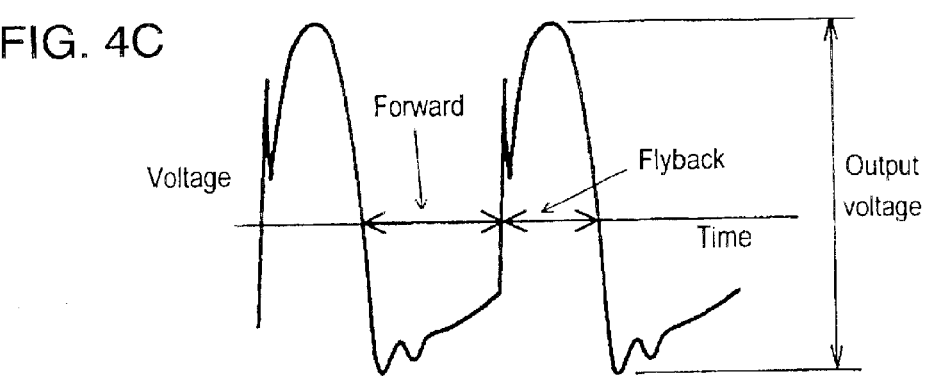
FIG. 4C is a voltage waveform diagram of the secondary winding of the transformer in a power supply apparatus of a conventional art and the first preferred embodiment of the invention.
Figure 5:
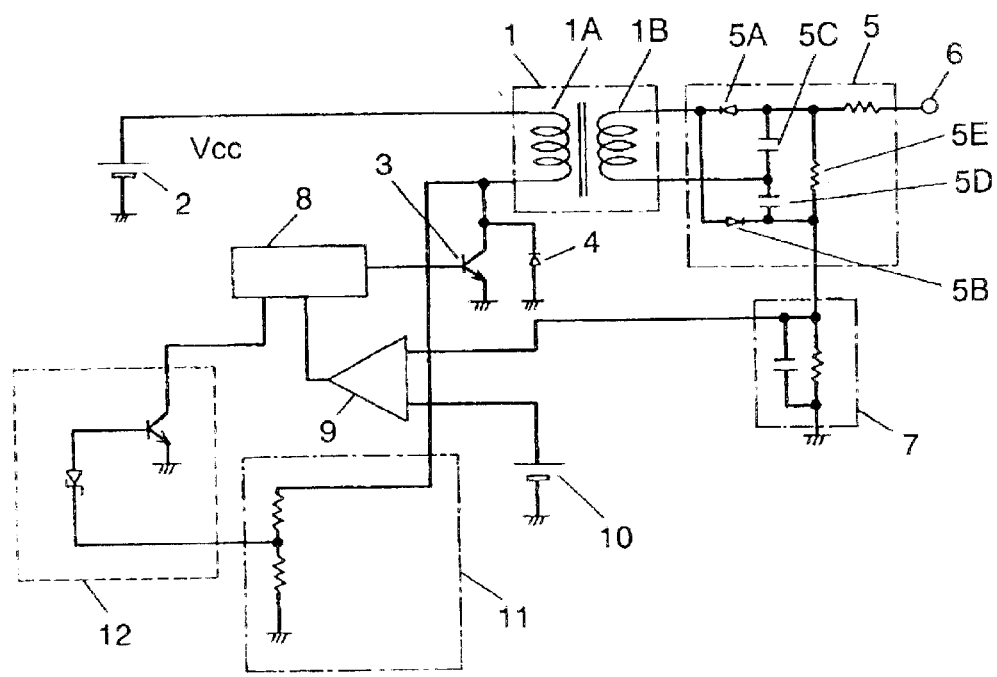
FIG. 5 is a circuit diagram of a conventional power supply apparatus.

When the load current is decreased with increase in the load impedance, since the voltage waveform in secondary winding 1B is such that has ringing portions both at the forward period and at the flyback period, similarly to the waveform shown in FIG. 4C, the output voltage of voltage doubler rectifier circuit 5 becomes the sum of the voltage peak value at the forward period and the voltage peak value at the flyback period.

At this time, the voltage waveform in primary winding 1A has also the negative portion of the ringing portion on the forward side as shown in FIG. 4B, analogously to the voltage waveform in secondary winding 1B. Hence, the voltage becomes such that is proportional to the output voltage. By detecting the voltage having the amplitude of the voltage waveform in primary winding 1A by AC voltage detector 14 being formed of a rectifier circuit, and feeding the detected voltage to limiter 12, the voltage on which limiter 12 operates becomes equal to the voltage it operates thereon when the voltage is the output voltage which is inherently expected.

Accordingly, load limiting characteristic becomes as shown in FIG. 3B, i.e., the output voltage exhibits no change even when the load current is decreased or when no-load operation is made.

Below will be described the limit of the ringing occurring on the forward side with reference to FIG. 1 and FIG. 4B.

When the voltage of the first DC power source, Vcc, is applied and the base current of transistor 3 is increased, and then if the collector-emitter voltage of transistor 3 is saturated to reach the ground voltage, the voltage waveform of primary winding 1A becomes two times as large as voltage Vcc because energy on the forward side is released during the flyback period.

In the present invention, in order to detect the ringing portion on the forward side, the detection input of AC voltage detector 14 is connected to the anode terminal of diode 13, one constituent of the series connection of transistor 3 and diode 13. Therefore, the excellent effect on the load limiting characteristic becomes noticeable when the voltage waveform in primary winding 1A, in which the ringing portion on the forward side is generated, exceeds two times the voltage of the first DC power source, Vcc.

The switching element of the present invention is constituted of a field-effect transistor (FET) or a bipolar transistor.

Further, the voltage doubler rectifier circuit of the present invention includes a voltage tripler and a voltage quadrupler rectifier circuit.

(Second Preferred Embodiment)

A second preferred embodiment of the present invention will be described with reference to the accompanying drawings.

Figure 2:
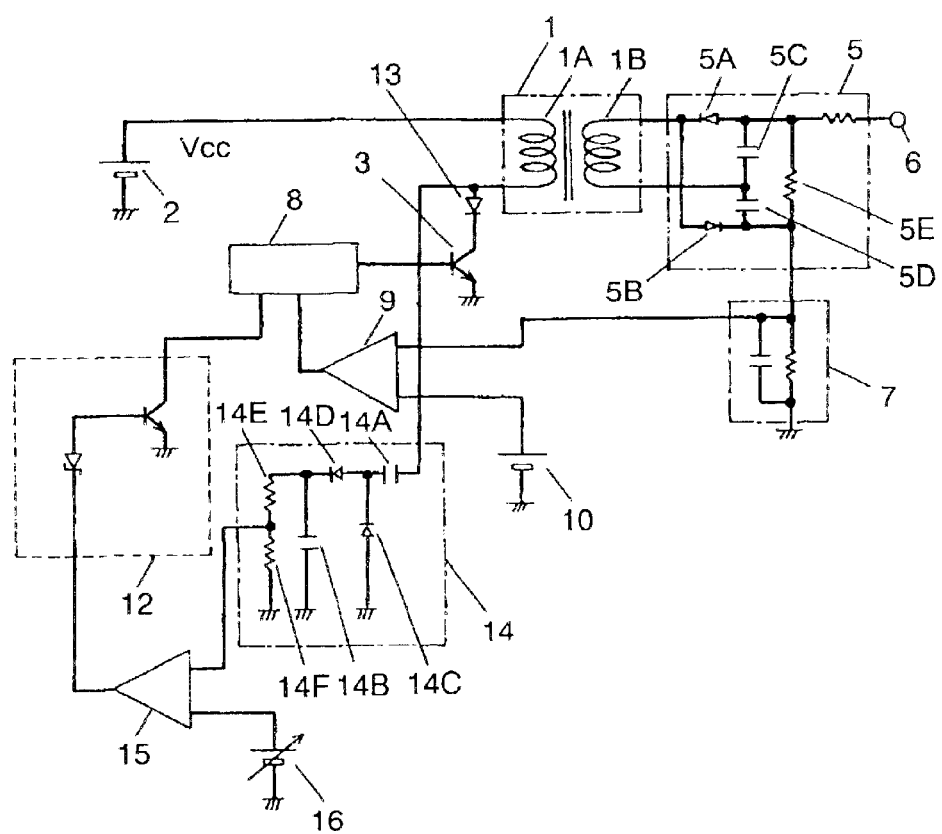
FIG. 2 is a circuit diagram of a power supply apparatus according to a second preferred embodiment of the invention.
Figure 3:
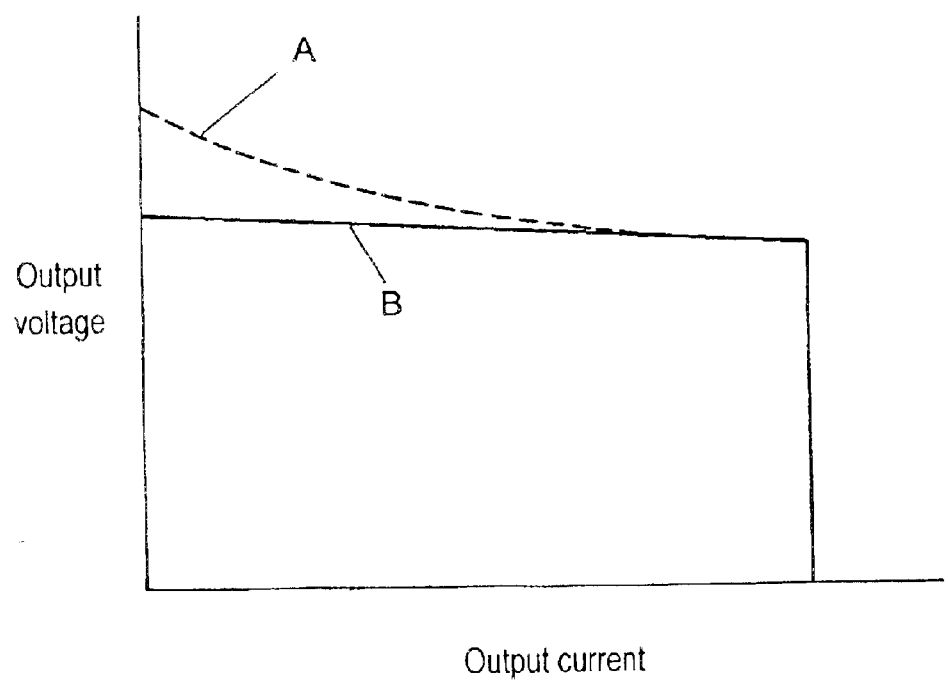
FIG. 3 is a diagram showing load limiting characteristics of the power supply apparatus of the first preferred embodiment of the invention and a power supply apparatus of a conventional art.

In FIG. 2, second DC power source 16 whose output voltage is variable is connected to one input of error amplifier 15 and the output of AC voltage detector 14 is connected to the other input. The output of comparison circuit 15 is connected to limiter 12.

Operation will be described below. The voltage of AC voltage detector 14 and second DC power source 16 are compared by comparison circuit 15. When the voltage of AC voltage detector 14 exceeds the voltage of second DC power source 16, the output of comparison circuit 15 sends a signal to limiter 12 so that the output of the power supply apparatus is limited.

When a dielectric breakdown has become liable to occur in the apparatus due to changes in environmental conditions, the voltage of second DC power source may be lowered. Then, the maximum output voltage of the power supply apparatus is lowered so that occurrence of the dielectric breakdown is prevented.

Incidentally, the comparison circuit of the invention includes a comparator and an error amplifier.

INDUSTRIAL APPLICABILITY

The present invention is aimed at a reduction in no-load voltage of a power supply apparatus for use in electrostatic recording apparatuses such as copiers and printers to thereby provide a small-sized power supply apparatus and peripheral equipment.

Owing to the present invention, it is attained to lower the voltage during no-load operation and thus provide a small-sized power supply apparatus and peripheral equipment.

What is claimed is:

1. A power supply apparatus comprising:
   a transformer having a primary winding and a secondary winding;
   a first DC power source connected with one terminal of said primary winding of said transformer;
   a diode having its anode connected with the other terminal of said primary winding of said transformer;
   a switching element connected between the cathode of said diode and the ground;
   a voltage doubler rectifier circuit connected with said secondary winding of said transformer;
   a current detector for detecting a DC current from said voltage doubler rectifier circuit;
   a control circuit for controlling said switching element in accordance with an output from said current detector;
   an AC voltage detector connected in parallel between a junction point between the anode of said diode and the other terminal of said primary winding of said transformer and the ground to sense positive and negative voltage in the AC input voltage; and
   a limiter for controlling said switching element when the output of said AC voltage detector exceeds a predetermined voltage value thereby limiting voltage of said secondary winding of said transformer.

2. The power supply apparatus according to claim 1, wherein the predetermined voltage is two times or above a voltage of said first DC power source in voltage amplitude in said primary winding of said transformer.

3. The power supply apparatus according to claim 1, further comprising:
   a second DC power source output voltage thereof being variable; and
   a comparison circuit for controlling said switching element when the output of said AC voltage detector becomes larger than the output of said second DC power source thereby limiting the voltage of said secondary winding of said transformer.

4. A power supply apparatus comprising:
   a transformer having an AC input voltage and an AC output voltage;
   switch means for controlling the AC input voltage;
   a diode coupled to said switch means for protecting said switch means;
   a voltage doubler rectifier circuit for converting the AC output voltage into a DC output voltage and having an output current;
   limiting means for limiting the AC output voltage, said limiting means including
   an AC voltage detector coupled to said transformer to sense positive and negative voltage in the AC input voltage, and
   comparing means for controlling the switch responsive to a result of comparing the output current from the voltage doubler rectifier circuit with an output of the AC voltage detector.

5. The power supply apparatus according to claim 2, further comprising:
   a second DC power source having an output voltage thereof being variable; and
   a comparison circuit for controlling said switching element when the output of said AC voltage detector becomes larger than the output of said second DC power source thereby limiting the voltage of said secondary winding of said transformer.

* * * * *